Figure 1:
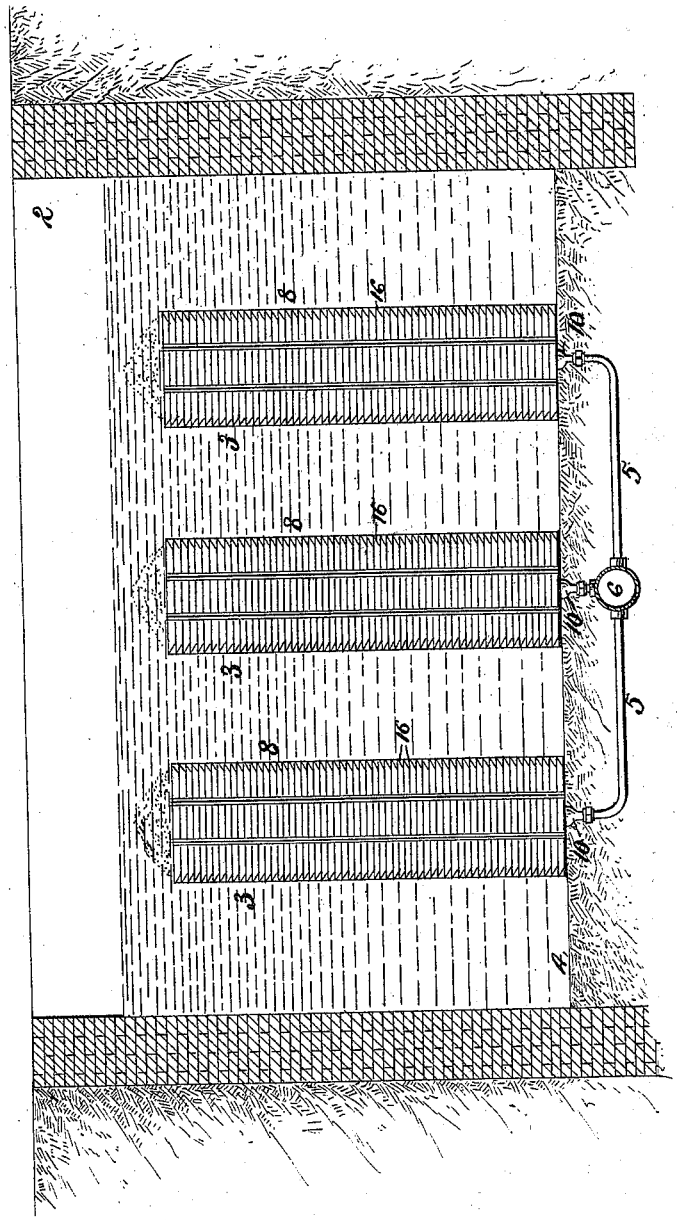

(No Model.) 2 Sheets—Sheet 1.
E. A. WILDER.
FILTER.
No. 600,939. Patented Mar. 22, 1898.

WITNESSES
INVENTOR
Edgar A. Wilder
BY
ATTORNEYS.

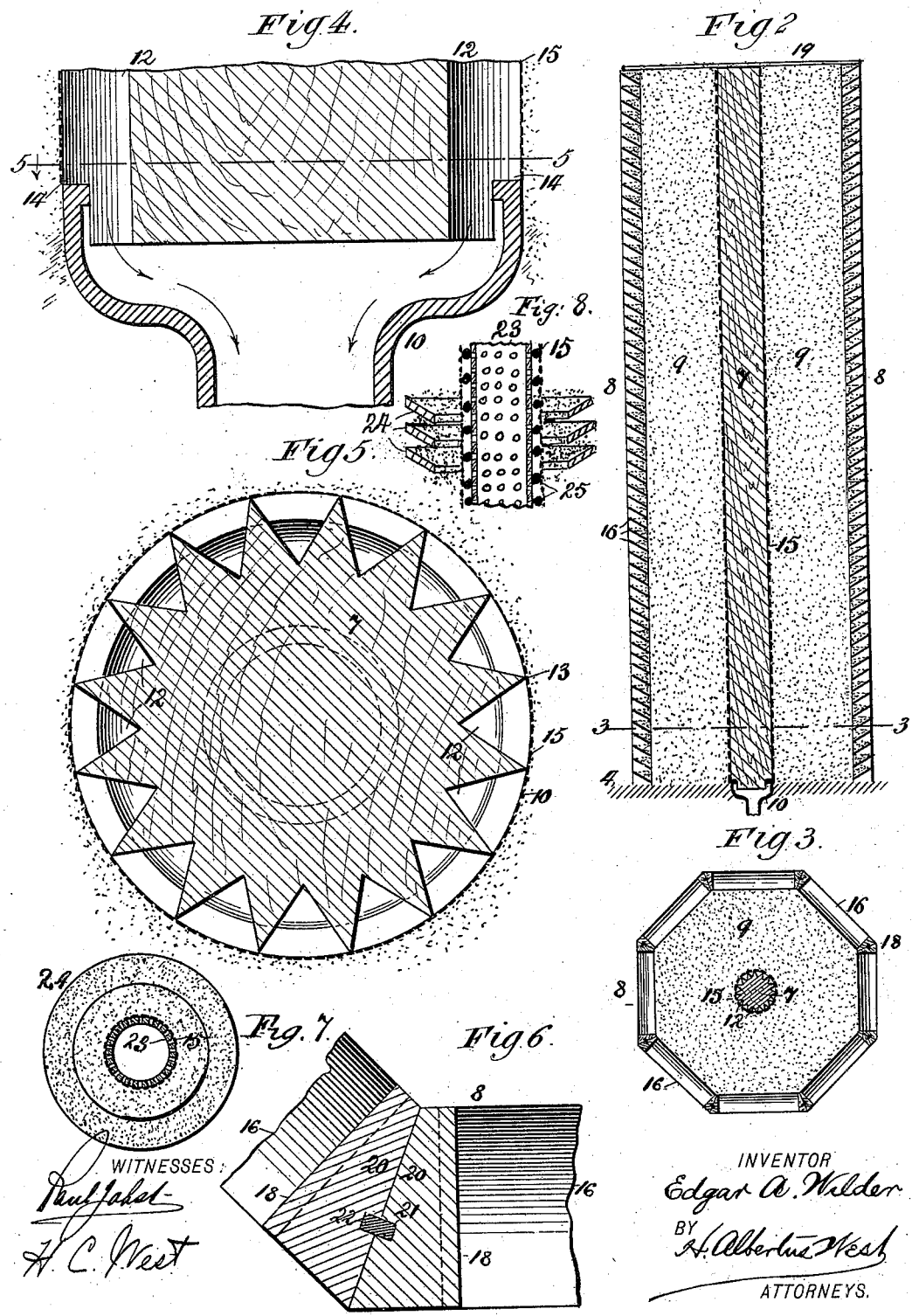

UNITED STATES PATENT OFFICE.

EDGAR A. WILDER, OF FREDONIA, NEW YORK.

FILTER.

SPECIFICATION forming part of Letters Patent No. 600,939, dated March 22, 1898.

Application filed March 19, 1897. Serial No. 628,258. (No model.)

*To all whom it may concern:*

Be it known that I, EDGAR A. WILDER, a citizen of the United States, and a resident of Fredonia, in the county of Chautauqua and State of New York, have invented certain new and useful Improvements in Filters, of which the following is a specification.

My present invention is an improvement upon the filter covered by Letters Patent No. 557,177, granted to me the 31st day of March, 1896; and the improvement consists, mainly, in constructing the filter in the form of separate cells, any number of which may be built up in the reservoir and from each of which filtered water is delivered into the service-pipe.

The invention also consists in the special construction of the cells and the parts thereof, all as hereinafter described and claimed.

In the accompanying drawings, to which reference is made and which form a part of this specification, Figure 1 illustrates a reservoir provided with three of my new filtering-cells, each connected to the main. Fig. 2 is a central sectional elevation of one of the cells. Fig. 3 is a transverse sectional view of the same on line 3 3 of Fig. 2. Fig. 4 is an enlarged vertical section of the preferred construction of the lower end of the cell. Fig. 5 is a sectional plan view of the same on line 5 5 of Fig. 4. Fig. 6 is an enlarged sectional plan view of one pair of posts and one set of supporting horizontal boards or slats for supporting the sand or other filtering material, and Figs. 7 and 8 show modifications.

In the drawings, 2 represents a reservoir to which the unfiltered water is admitted, and 3 3 represent filtering-cells built up on the bottom 4 of the reservoir and each centrally connected by a passage or pipe 5 to the service-pipe 6. Each cell is constructed of an upright effluent core 7, a surrounding open cage 8, and a body of sand or other filtering material 9, filled in between the said core and cage, as shown clearly in Figs. 2 and 3, and through which the water percolates to vertical ducts or passages in the core, from which it flows to the service-pipe in a purified and filtered condition.

The core 7 may be made of metal, but is by preference made of wood, socketed or otherwise held in and upon a basin 10, formed or fitted in the floor of the reservoir, and which forms a part of a connection or coupling for connecting the ducts or passages of the core with the eduction-pipe 5, the ducts or passages being deeper than the diameter of the basin, as illustrated in Fig. 4. The said ducts or passages of the core are by preference formed by channeling the outside of the core, thus forming longitudinal passages 12, reaching from end to end of the core, and in order that the core may present the least possible resistance to the free ingress of water from the filtering material I prefer to form the core with points or angles 13. If the core be made round, as shown, the ducts and angles will alternate entirely around the core, so that the largest extent of filtering-surface possible will be attained—that is, so that the whole circumference of the cell will be free for the filtration of water. The lower ends of the angles 12, as here shown, are cut away to form shoulders 14, which support the core upon the edge of the basin 10, as shown clearly in Fig. 4.

The sand or other filtering material 9 is prevented from entering the ducts or passages of the core 7 by a suitable screen or jacket 15, placed around the core. This screen may be of wire-cloth, perforated sheet metal, or other suitable material, held in place, preferably, against the angles 13 of the core, as shown.

The cage 8 is made up of sustained slats 16, preferably set at a stop or angle deflecting inward, so that the filtering material 9 will not only be held in place in the cell, but so that horizontal ledges of filtering material will be formed around the filter. These ledges increase the extent of filtering-surface exposed for the percolation of water and also retain the silt and other deposits from the water and enable the filter to be cleaned from the outside by spraying when the reservoir is empty or by agitation when the same is full.

The slats 16 are sustained by posts 18, grooved to receive the ends of the slats. The upper ends of the posts may be stayed to the core by the cross-pieces 19 or otherwise braced, if found necessary. In case the filter be polygonal in form, as shown, I prefer to construct each side by means of separate panels, which can be made complete at a factory. In such case adjacent posts will be shaped to match, as shown in Fig. 6—that is, they will be formed with diagonal surfaces 20 20, as shown in Fig. 6—and a tongue and groove 21 22 will be employed in the matched surfaces, as shown, to prevent displacement of the panels.

In case the filtering material be heaped upon the tops of the cells, as shown in Fig. 1, the upper ends of the ducts in the core will be closed by a plate or other means placed upon this top of the core, as will be clearly understood.

In the modification shown in Fig. 7 the central core is formed of a perforated tube 23, preferably metal, covered with wire-cloth to prevent the filtering material from passing through the perforations. This form of core may be used with the outer walls composed of separate slats, as shown in the other figures of the drawings, or in any case the outer wall may be made up of annular plates or disks 24, as shown in Fig. 8, each preferably dished and supported one above another by suitable interposed supports, and, if desired, a coil of wire 25 or other support or spacing may be interposed between the core and the wire-cloth 15 to afford ample waterway and prevent the same from clogging the passages.

Having thus described my invention, what I claim as new, and desire to secure by Letters Patent, is—

1. A filter comprising an effluent core, an outer open wall around said core formed of superposed spaced supports and a body of filtering material sustained by the said supports between their inner edges and the said core, substantially as described.

2. A filter comprising a core formed with ducts or passages for filtered water, outer open walls formed of slats spaced one above the other and a body of filtering material sustained by the slats between the said core and walls; substantially as described.

3. A filter comprising a central core formed with ducts or passages for filtered water and surrounded by a perforated jacket, combined with an outer wall composed of slats spaced one above another and a body of filtering material sustained by said slats; substantially as described.

4. A filter comprising a core formed with ducts or passages for filtered water combined with a wall composed of inclined slats sustained one above another and a body of filtering-sand sustained by and upon said slats; substantially as described.

5. A filtering-cell comprising the core 7 formed with longitudinal grooves 12 and angles 13, a perforated jacket 15 surrounding said core, a supporting-basin 10 for said core, a surrounding wall composed of posts 18 and diagonal slats 16 sustained one above the other by said posts and a body of sand or other filtering material interposed between said core and jacket and the said slats; substantially as described.

EDGAR A. WILDER.

Witnesses:
H. P. PERRIN,
W. B. BARKER.